Oct. 28, 1952     O. P. HADLEY     2,615,235
METHOD OF MAKING FITTINGS FOR COUPLING THE ENDS OF TUBES
Filed March 30, 1949
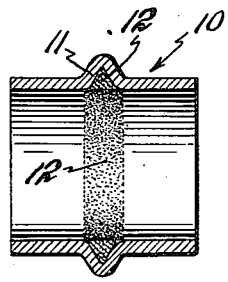
Fig. 1.
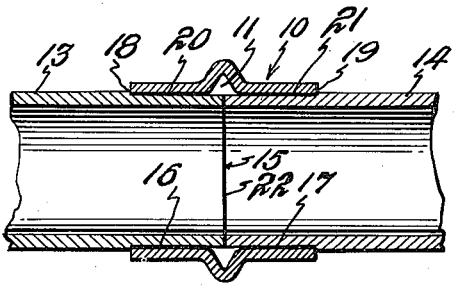
Fig. 2.
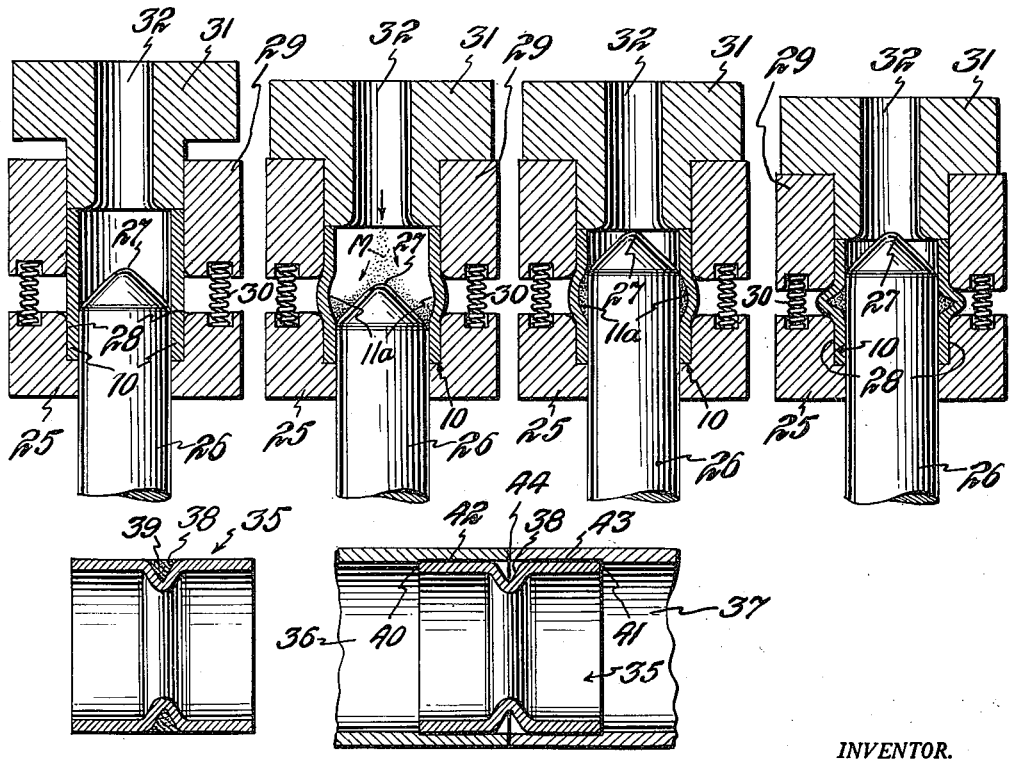
Fig. 3.    Fig. 4.    Fig. 5.    Fig. 6.
Fig. 7.    Fig. 8.
INVENTOR.
Orval P. Hadley
BY
Oliver S. Titcomb
his ATTORNEY Patented Oct. 28, 1952

2,615,235

UNITED STATES PATENT OFFICE 2,615,235

METHOD OF MAKING FITTINGS FOR COUPLING THE ENDS OF TUBES

Orval P. Hadley, Evansville, Ind., assignor to Servel, Inc., New York, N. Y., a corporation of Delaware Application March 30, 1949, Serial No. 84,352

1 Claim. (Cl. 29—148.2)

The present invention relates to brazing and more particularly to a method of making a fitting for coupling the ends of tubes or pipes.

While the method and fitting of the present invention may have other applications, it is particularly adapted for coupling the pipes or tubing of refrigeration apparatus. Heretofore, each of the joints between pipes or tubes in refrigeration apparatus have been welded individually, usually by means of an acetylene torch. It is now proposed to braze a plurality of joints simultaneously by merely assembling the parts, applying brazing material adjacent the joints and heating the assembly to the melting temperature of the brazing material. However, considerable difficulty has been experienced in mass production in insuring the application of the proper amount of brazing material adjacent the joints, especially when powdered brazing material is used.

One of the objects of the present invention is to provide a method of making a fitting for brazing a joint between the ends of tubes or pipes which insures the positive application of a proper amount of brazing material closely adjacent the joint to be bonded.

Another object is to provide a fitting adapted to receive the ends of tubes to be coupled and containing brazing material which flows outwardly between the tubes and fitting by capillary action to completely fill the joint with brazing material and provide clean metal surfaces at the exterior of the joint.

Another object is to provide a fitting of the type indicated having powdered brazing material compacted into an annular recess therein to provide a self-sustained briquette of the material.

Still another object is to provide a method of making a fitting for coupling the ends of tubes or pipes by brazing which adapts the parts to be easily and quickly assembled and produces a reinforced joint.

These and other objects will become apparent from the following description and drawing in which like reference characters denote like parts throughout the several views. It is to be expressly understood, however, that the drawing is for the purpose of illustration only and not a definition of the limits of the invention, reference being had for this purpose to the appended claim. In the drawing:

Fig. 1 is a longitudinal sectional view of a fitting incorporating the novel features of the present invention and showing powdered brazing material compacted in a recess at the interior thereof;

Fig. 2 is a longitudinal sectional view of two pipes coupled by the fitting illustrated in Fig. 1 and showing the brazed joints between the abutting ends of the tubes and between the tubes and the fitting;

Fig. 3 is a sectional view of one form of apparatus for making the fitting illustrated in Fig. 1 and showing the position of the dies at the beginning of a forming operation;

Fig. 4 is a view similar to Fig. 3 showing the fitting compressed axially between the dies to form an annular recess and powdered brazing material being applied to the interior of the fitting;

Fig. 5 is a view similar to Fig. 4 and showing a mandrel moved upwardly in the fitting to confine the powdered brazing material in the recess;

Fig. 6 is a view similar to Fig. 5 and showing the fitting being further compressed to compact the powdered brazing material in the annular recess;

Fig. 7 is a sectional view of a fitting of modified construction in which the recess is formed in the exterior of the fitting; and Fig. 8 is a longitudinal sectional view of two tubes coupled by the fitting illustrated in Fig. 7.

The method of the present invention comprises the steps of forming a fitting with an annular recess intermediate its ends and compacting powdered brazing material in the recess to provide a self-sustained compact of the material. The fitting may be in the form of a sleeve of a size to receive and closely fit the ends of tubes to be coupled and provided with an annular recess in its inner periphery or the fitting may be formed as an inner tube to closely fit the interior of the tubes to be coupled with an annular recess in its outer periphery. In either case powdered brazing material is compacted in the annular recess to provide a self-sustained briquette of the material. The ends of the tubes to be coupled are then telescoped with the fitting to position their abutting ends midway of the compacted briquette of brazing material in the annular recess. Preferably the ends of the tubes to be joined are machined, either externally or internally in accordance with the type of fitting used, to provide a close fit with the fitting and also provide shoulders engageable with the ends of the fitting to position the abutting ends of the tubes at the center of the compacted brazing material. The assembly is then heated to the melting temperature of the brazing material which flows by capillarity between the fitting and side walls of the tubes and between the abutting ends of the tubes. It has been found that the brazing material will completely fill the joints to bond the parts, seal the joints and provide a fillet of clean metal at the exterior of the joints. Furthermore, the brazed joint is reenforced by the fitting which causes any bending to take place at the point remote from the joint.

Referring to the drawing, Figs. 1 and 2 illustrate a preferred embodiment of fitting 10 incorporating the novel features of the present invention. The fitting 10 is in the form of a sleeve having a portion of its side wall deformed outwardly to provide an annular recess 11 at the interior thereof and located midway between its ends. Powdered brazing material is compacted in the recess 11 to provide a self-sustained annular briquette 12 having an inside diameter flush with the inside diameter of the fitting or sleeve.

Tubes 13 and 14 to be bonded are inserted into the fitting 10 so that their ends abut at 15 at the center of the compacted briquette 12 of brazing material. Preferably, the ends of the tubes 13 and 14 are sized, as by a machining operation, to provide reduced end portions 16 and 17 which closely fit the interior of the fitting 10 and provide shoulders 18 and 19 engageable with the ends of the fitting. The shoulders 18 and 19 act as stops for positioning the abutting ends of the tubes centrally of the briquette 12 of brazing material. The ends of the tubes 13 and 14 may abut each other throughout their entire circumference or they may abut at one or a plurality of points so long as the space between them is not too great.

The assembly is then heated to the melting temperature of the brazing material 12 which flows axially between the fitting 10 and ends 16 and 17 of tubes 13 and 14 by capillary action to form continuous films 20 and 21 as illustrated in Fig. 2. The brazing material also flows by capillary action between the abutting ends of tubes 13 and 14 to provide a continuous film 22. It has been found that with the use of a fitting 10 as illustrated in Fig. 1 the brazing material completely fills and seals the joints between the fitting and tubes 13 and 14 and between the abutting ends of the tubes. Furthermore, it has been found that the brazing material will flow throughout the length of the fitting and form a fillet of clean brazing material between the ends of the fitting and side walls of the tubes.

While the fitting 10 may be made in any suitable manner, a preferred forming apparatus is illustrated schematically in Figs. 3 to 6. The apparatus comprises a lower fixed die 25 having a centrally positioned opening in which a closely fitting mandrel or plunger 26 is adapted to reciprocate, the mandrel having a conical nose 27 at its upper end. The die 25 has an annular recess 28 surrounding the mandrel 26 to receive the lower end of a fitting blank 10 therebetween. An upper movable die 29 is held in spaced relation to the low die 25 by suitable springs 30 and has a centrally located opening to receive and closely fit the upper end of the fitting blank 10. Movably mounted in the central opening of the die 29 is a second plunger 31 having a central opening 32. When a force is applied to the top of the plunger 31 to move it from the position illustrated in Fig. 3 to that illustrated in Fig. 4, the fitting blank 10 is compressed axially causing its side wall between the lower and upper dies 25 and 29 to bulge outwardly and form an annular recess 11a. A predetermined quantity of powdered brazing material M is then inserted to the interior of the fitting through the opening 32 in the plunger 31. The powdered brazing material is directed by the conical nose 27 at end of mandrel 26 toward the annular recess 11a as illustrated in Fig. 4. The mandrel 26 is then moved upwardly from the position illustrated in Fig. 4 to that illustrated in Fig. 5 to trap the powdered material in the partially formed recess 11a. Further pressure is then applied to the top of plunger 31 to move it together with the upper die 29 toward the lower die 25 which further compresses the outwardly bulged side walls of the fitting blank 10 to compress and compact the powdered brazing material into a self-sustained briquette in the formed pocket or annular recess 11. During the compacting or compressing operation the powdered brazing material is held in the pocket by the mandrel 26. The parts of the forming apparatus are then moved away from each other and the finished fitting removed therefrom.

In Fig. 7 a fitting 35 of modified construction is illustrated. In this modified construction the fitting 35 is adapted to telescope into the ends of tubes 36 and 37 to be bonded, see Fig. 8, and an annular recess 38 is formed in its outer periphery. Powdered brazing material is compacted in the recess 38 to provide a self-sustained briquette 39 having an outer periphery flush with the outer periphery of the fitting. Preferably the inside ends of the tubes 36 and 37 are machined to closely fit the periphery of the fitting 35 and provide shoulders 40 and 41 for positioning the ends of the tubes at the center of the brazing material. When heated to melting temperature the brazing material flows outwardly to form continuous films 42 and 43 between the fitting and ends of the tubes and a continous film 44 between the abutting ends of the tubes.

It will now be observed that the present invention provides a method of and fitting for coupling the ends of tubes by brazing which insures the positive application of the proper amount of brazing material to the joints. It will still further be observed that the present invention provides a fitting adapted to receive the ends of tubes to be coupled and which contains powdered brazing material compacted into an annular recess therein to provide a self-sustained briquette of the material. It will still further be observed that the present invention provides a method of and fitting for coupling the ends of tubes by brazing which permits the parts to be easily and quickly assembled, causes flow of the brazing material between the tubes and fitting by capillarity to bond the parts and seal the joint, and produces a finished joint reenforced by the fitting.

While two embodiments of the invention are herein illustrated and described, it will be understood that further modifications may be made in the steps of the method and in the form of the fitting without departing from the spirit or scope of the invention. Therefore, without limitation in this respect, the invention is defined by the following claim.

I claim:

The method of making a fitting for coupling the ends of tubes telescoped therewith comprising the steps of compressing a section of tube lengthwise and controlling its deformation to cause it to buckle intermediate its ends to form an annular recess, supplying powdered brazing material to the recess, and continuing the compression and deformation of the tube section while confining the powdered brazing material in the recess to cause the material to be compacted in the groove to form a self-sustained annulus of the material therein.

ORVAL P. HADLEY.

REFERENCES CITED

The following references are of record in the file of this patent:

UNITED STATES PATENTS

| Number | Name | Date |
|---|---|---|
| 1,776,502 | Gresley et al. | Sept. 23, 1930 |
| 1,801,171 | Mueller et al. | Apr. 14, 1931 |
| 2,005,189 | Hern | June 18, 1935 |
| 2,053,808 | Young | Sept. 8, 1936 |
| 2,084,207 | Lindquist | June 15, 1937 |
| 2,215,476 | Peters | Sept. 24, 1940 |
| 2,297,554 | Hardy et al. | Sept. 29, 1942 |
| 2,487,001 | Taylor et al. | Nov. 1, 1949 |

FOREIGN PATENTS

| Number | Country | Date |
|---|---|---|
| 487,263 | Great Britain | June 17, 1938 |